Dec. 19, 1967  G. M. SPENCE  3,358,342
APPARATUS FOR FORMING CONCRETE ARTICLES
Filed Nov. 9, 1964  2 Sheets-Sheet 1
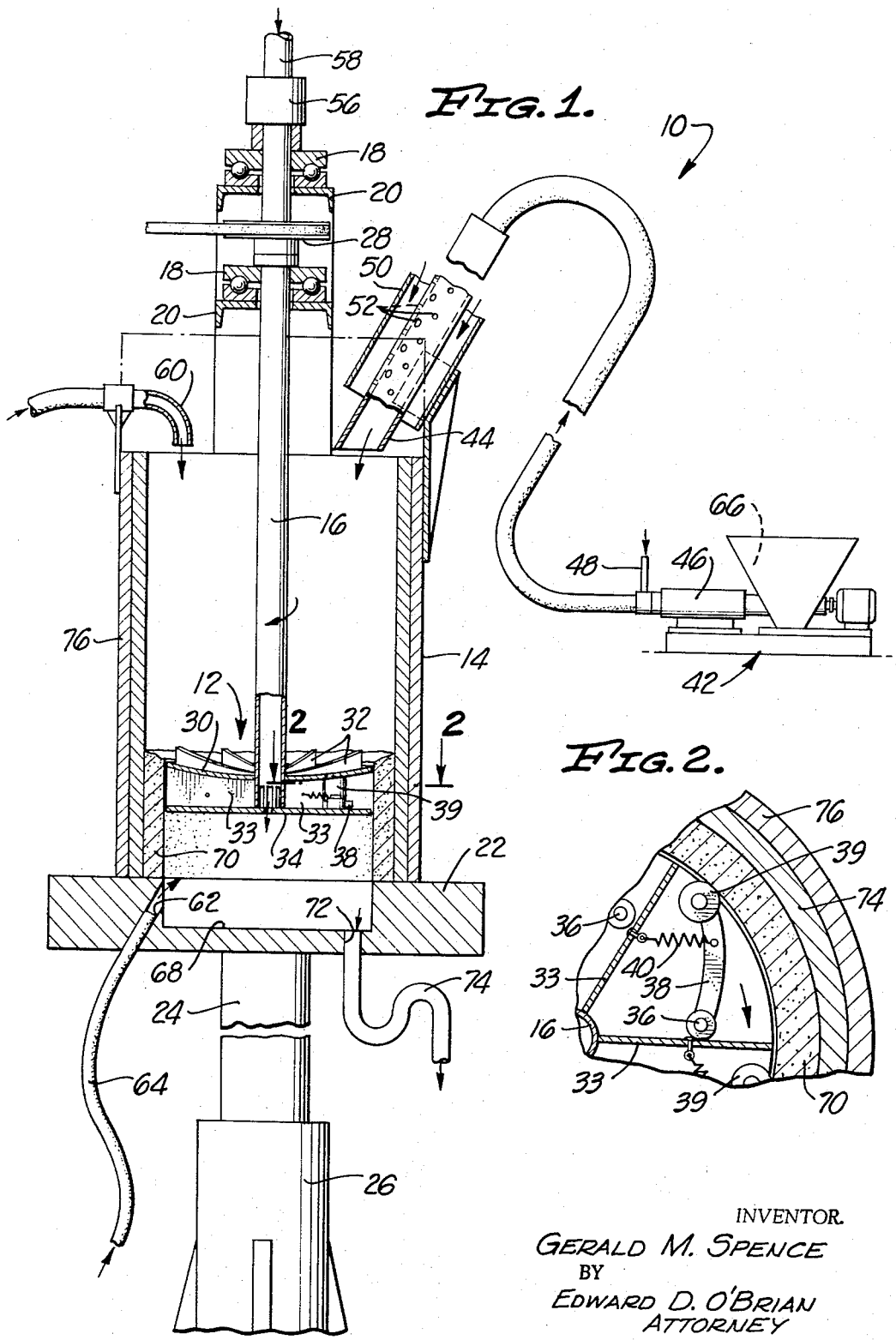
INVENTOR.
GERALD M. SPENCE
BY
EDWARD D. O'BRIAN
ATTORNEY

INVENTOR.
GERALD M. SPENCE
BY
EDWARD D. O'BRIAN
ATTORNEY

United States Patent Office 3,358,342
Patented Dec. 19, 1967

3,358,342
APPARATUS FOR FORMING CONCRETE ARTICLES
Gerald M. Spence, Tehachapi, Calif., assignor to Monolith Portland Cement Co., Los Angeles, Calif., a corporation of California
Filed Nov. 9, 1964, Ser. No. 409,718
1 Claim. (Cl. 25—30)

ABSTRACT OF THE DISCLOSURE

A mold having an interior surface arranged for forming the exterior shape of a concrete article is arranged for rotation. A concrete conduit having a discharge opening at its end is positioned to discharge concrete into the mold. Rollers are positioned on a distributor head which rotates with respect to the mold to form the interior surface of the concrete article away from the mold surface. Carbon dioxide nozzles are positioned to substantially fill the mold with carbon dioxide gas. The interior of the mold in which the concrete article is being formed against the walls of the mold is substantially filled with carbon dioxide gas. By this means, a hollow concrete article is formed in a carbon dioxide atmosphere to speed its hardening.

---

At the present time a number of different processes are known for use in manufacturing concrete articles such as pipe. One common method involves merely locating concrete between appropriate mold elements and allowing the concrete to harden by various hydration reactions which are well-known in a cement field. Although this procedure has many advocates, and is frequently used it is believed that it is possible to manufacture concrete pipe of a greater degree of uniformity and at an economic saving through the use of other techniques.

Certain types of such pipe are manufactured commercially at this time using a mandrel type process. Because of various factors unnecessary to an understanding of this invention it is generally held or believed that this type of process is limited in its application to concrete mixtures containing a relatively high proportion of fibrous type materials.

Concrete pipe is also manufactured at the present time by processes in which the concrete is either thrown against an interior of a mold through the use of an impeller type of structure or deposited on a rotating mold and manipulated so as to assume a desired surface configuration. Machines of these types are sometimes referred to as "packer-head" and "centrifugal casting" machines, respectively. In spite of the fact that such machines are commonly known and used certain problems arise from their use.

Certain of these problems evolve about the nature of the reactions involved in the setting or stiffening of the cement which is in concrete. Common portland cement becomes first stiff and then sets to a completely hard state as the result of hydration reactions with water. Because of the nature of these reactions it is difficult to rapidly create concrete pipe which is sufficiently stiff so that it can be removed from a mold without deformation utilizing such centrifugal or packer-head type methods. This, of course, affects the cost of pipe produced by such procedures.

An object of the present invention is to provide a new and improved apparatus of the centrifugal and/or packer-head variety for manufacturing pipe, conduit or the like. Related objects of this invention are to provide different apparatuses of this type which are relatively inexpensive to manufacture, which can be reliably and easily used for long periods without significant maintenance, and which are very effective for their intended purposes. Another object of this invention is to provide new and improved processes for the manufacture of pipe, conduit and the like using, and based on what are commonly referred to as centrifugal and/or packer-head type processes. Further objects of this invention are to provide methods of this type which are reliable, easy to employ and which can be carried out with only limited modification of existing equipment.

From these objects it will be realized that the purpose of the present invention is to eliminate or solve certain of the problems presently encountered with known centrifugal and/or packer-head type of apparatuses and processes. Various objectives of this present invention relating to the manner in which these general objects are achieved will be more fully apparent from a detailed consideration of the remainder of this specification, the appended claims and the accompanying drawings in which:

FIG. 1 is a cross-sectional view of a "packer-head" type of pipe casting machine embodying this invention;

FIG. 2 is a partial cross-sectional view taken at line 2—2 of FIG. 1;

Figure 4:
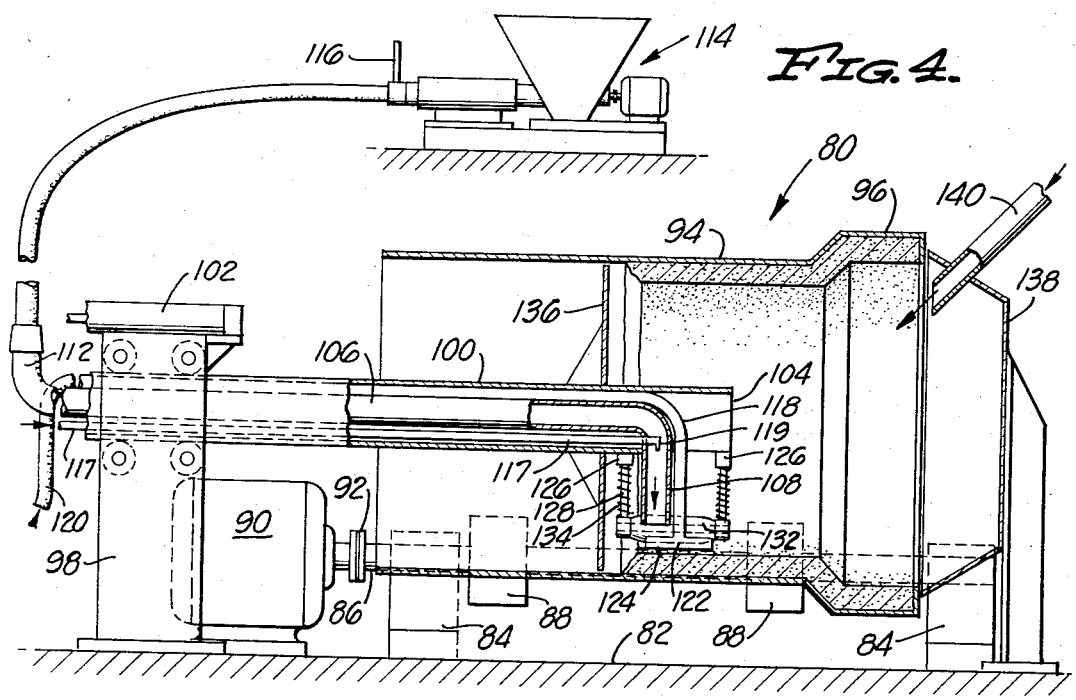
FIG. 4 is a cross-sectional view taken at line 4—4 of FIG. 3.

From a careful consideration of the drawings those skilled in the art of manufacturing concrete articles utilizing molds or forms will realize that none of the figures of the drawings are intended so as to exactly illustrate a specific machine, and that the drawings are primarily of a diagrammatic character so as to clearly illustrate the character of two presently preferred forms or embodiments of this invention. Such individuals will also realize as a result of a careful consideration of the remainder of this specification that both of these machines are constructed so as to practice methods of this invention, and that various existing equipment may be readily modified through the use or exercise of routine engineering skills so as to be capable of being used in practicing these methods and/or so as to embody the features of apparatuses as herein set forth. Because of these factors this invention is to be considered as being defined by or limited by the appended claims, and not by the accompanying drawings.

As an aid to understanding this invention it can be stated in essentially summary form that it concerns the exposure of a concrete mixture to carbon dioxide gas either a comparatively short time interval before and/or during the same time interval that the mixture is applied to the interior of a mold and/or immediately after or simultaneously with the application of the mixture to the interior of the mold. It can also be stated in essentially summary form that another aspect of the invention includes structures for incorporating carbon dioxide gas with a concrete mixture as it is being moved into the interior of a mold and/or substantially at the same time such a mixture is being applied to the interior of the mold and/or immediately following the application of such a mixture to the interior of the mold.

This invention is best more fully explained by referring directly to the accompanying drawing. In FIG. 1 of the drawing there is shown a pipe casting machine 10 of this so-called "packer-head" variety utilizing a concrete applier and distributing head 12 which is movable within the interior of and along the axis of a cylindrical mold 14. In the particular machine 10 the head 12 is supported upon a rotatable hollow shaft 16 which in turn is supported so as to always rotate in the same position by means of thrust bearings 18 mounted on a conventional framework 20.

In the particular machine 10 the mold 14 is supported by a movable platen 22 which in turn is carried by a ram 24. This ram 24 is capable of being moved along a line toward and away from the head 12 with this type of construction for a purpose which is hereinafter described. The ram 24 shown preferably extends from a conventional hydraulic cylinder 26, although other mechanical equivalents can be used in order to support this ram.

From a consideration of this construction it will be realized that the particular means shown provide a manner whereby the mold 14 may be moved in a vertical manner with respect to the head 12. This permits a simplification of the head 12 and various structures associated with it over the structures found in prior related "packer-head" machines of a related character. It also permits the machine 10 to use a multi-story structure in which the platen 22 can be moved to the lower story for replacement of the mold 14 and storage of the products created within it for curing and other purposes.

The head 12 is adapted to be turned through the use of a conventional drive pulley 28 attached to it. Various other obvious mechanical equivalents can be substituted for this pulley 28 for the purposes of causing rotation to the head 12. It will be realized that the pulley 28 is attached to the head 12 through the shaft 16 so as to always be positioned exteriorly of the mold 14.

The head 12 includes a distributing disc 30 which is attached concentrically to the shaft 16 so as to have its edges spaced from the interior of the mold 16 a distance corresponding to the thickness desired in a complete pipe (not shown) to be created within this mold. Preferably the disc 30 is of a concave shape and "opens" upwardly towards the top of the mold 14 so that it will serve more efficiently to outwardly distribute the material to be molded within the mold 14. For the purpose of aiding in the distribution of such material against the mold 14 a plurality of radial blades 32 corresponding to the blades of a centrifugal pump impeller may be located on the upper surface of this disc.

A plurality of spacers 33 depend from the lower surface of the disc 30 and support another disc 34 serving as a closure plate. This disc 34 is of the same external diameter as the disc 30, and the two are mounted co-axially with respect to the shaft 16. Thus, with this construction there is in effect a disc-like chamber (unnumbered) defined between the discs 30 and 34, and this chamber is open at its periphery.

A plurality of separate rod-like shafts 36 are mounted adjacent to and between the peripheries of the discs 30 and 34 to support curved packing blades 38. Each of these blades 38 preferably carries a vertically extending rotatable packing roller 39. These blades are rotatably mounted on the shafts 36 so as to be capable of swinging outwardly past the peripheries of the discs 30 and 34 as the shaft 16 is rotated. Comparatively weak springs 40 are attached to these blades 38 so as to connect them with the spacers 33 so as to normally bias them to positions in which they do not extend past the discs 30 and 34. These springs 40, however, are sufficiently weak so as to permit the blades 38 to move outwardly during the use of the machine 10.

This machine 10 includes a conventional mixer conveyor structure 42 which serves to convey a concrete mix through a chute 44 into the interior of the mold 14 as the machine 10 is operated. Preferably this mixer structure 42 is in the nature of a conventional broken flight conveyor located within an enclosed housing 46. With this construction a carbon dioxide gas inlet 48 may be located so as to extend into the housing 46, enabling the mixer structure 42 to mix such gas with a concrete mixture a comparatively short time interval prior to such a mixture being located within the interior of the mold 14.

In addition, a carbon dioxide gas manifold 50 may be located around the exterior of the chute 44. This manifold 50 is connected to the interior of the chute 44 by a series of outlet openings 52 which may be used to supply carbon dioxide gas to material moving through the chute 44 so as to impregnate it with or expose it to this gas to as full an extent as possible. Such gas may be supplied in the manifold through a conventional inlet 54.

In addition, a conventional rotary pipe-joint coupling 56 may be supplied on the end of the shaft 16 away from the head 12 so as to convey carbon dioxide gas from an inlet pipe 58 down to the space between the discs 30 and 34. Another plain inlet pipe 60 may be used so as to blanket the interior of the mold 14 with carbon dioxide gas.

Further carbon dioxide gas may also be introduced into the bottom of the mold 14 through a small passage 62 in the movable platen 22. A flexible tube 64 may be attached to the passage 62 for the purpose of conveying carbon dioxide gas to this passage.

During use of machine 10 a quantity of material constituting a concrete mixture (not shown) is introduced into an inlet 66 leading to the mixture structure 42. At the same time the carbon dioxide gas is supplied under pressure to the inlet 48, the manifold 50, the pipe 58, the pipe 60, and the tube 64. As this material moves through the mixture structure 42 it comes in contact with this gas. As it further moves through these chutes 44 further carbon dioxide comes into contact with it and to some extent is mixed with it.

As the material is discharged from the chute 44 it hits upon the disc 30 forming a part of the rotating head 12 so as to disseminate outwardly into contact with the interior of the mold 14. The blades 32 aid in propelling the material in this manner. Further the particular shape of the disc 30 is considered to facilitate an equal dispersion of material outwardly. During these operations the entire interior of the mold 14 is filled to a significant extent by carbon dioxide gas passing through the pipe 60 and through the tube 64 because of the fact that this gas is of greater density than air. Hence, during all of these operations the material moving from the chute 44 is figuratively "bathed" in carbon dioxide gas.

As the machine 10 is operated the ram 24 is moved so as to withdraw the head 12 from an initial position in which all of it except the disc 30 fits within a cavity 68 in the platen 22. Such movement of the ram 24 (causing movement of the platen 22) is coordinated at the rate at which material is located as previously described within the interior of the mold 14 so as to build up within this material a layer 70 which will constitute a part of pipe or tube. During such relative movement by virtue of the relation of the head 12 on the shaft 16 the blades 38 will move outwardly so as to tend to thrust the rollers 39 against the material against the interior of the mold, providing a smooth surface on and tending to remove water from the concrete mixture. Any such water which drains out will flow through a hole 72 leading through the platen 22 from the bottom of the cavity 68. Escape of gas through the hole is prevented by means of a conventional drain trap 74.

As relative motion occurs in this manner gas supplied through the inlet pipe 58 will be distributed directly upon the material deposited within the interior of the mold and in addition this material will be contacted with carbon dioxide gas supplied through the platen 22 and the flexible tube 64. The net result of these latter will be that the materials within the layer 70 built up will be contacted with a significant amount of carbon dioxide gas in addition to being contacted by this gas from other sources as previously indicated as it is applied to the interior of the mold 14 and as it is being applied and immediately after it is applied.

The significance of this can be explained by referring to a minor extent to the chemistry of portland cement. In such portland cement there may be some free lime. Contacting such free lime with carbon dioxide will result in the formation of calcium carbonate, a substantially insoluble material which tends to increase the stiffness or viscosity within a complete cement mixture where it is found. In addition, and more important as various compounds within the cement mixture come into contact with water and begin to hydrate some free lime is liberated. Such free lime will react with carbon dioxide in the same manner. During such reaction heat is liberated by virtue of exothermic reactions. This heat tends to promote or speed up the hydration of various compounds within the cement. Hence, as a result of these factors the layer 70 created throughout the length of the mold 14 during the use of the machine 10 is caused to become relatively stiff virtually as this layer is created and immediately thereafter.

The heat liberated by the reactions noted are considered to contribute materially to this. If desired additional heat may be applied to the exterior of the mold 14 by means of a heating jacket located around its exterior. The heating jacket 76 shown is of conventional electrically heated variety. Other equivalent known heating jackets may be utilized. If desired it is possible to incorporate electrical or related heating elements directly within the interior of the mold 14.

The significance of this invention is also considered to be related to the fact that during the initial hydration of the cement compounds both before and more important after a concrete mixture is created in the layer 70, a cement hydrate tends to form with some liberation of calcium hydroxide. By virtue of the quantity of carbon dioxide gas present and the manner in which this gas is distributed—first in contact with the cement mixture and then be subsequently within the interior of the layer created—some carbon dioxide causes a formation of calcium carbonate precipitate directly within the voids of this layer. This is considered to result in at least a significant "plugging" of void space within the layer 70 so as to tend to make the layer 70 comparatively impervious in character. It is also considered that this in turn effects the permanent character of this layer in various essentially physical means such as coloration.

The net effect of utilizing carbon dioxide gas as explained, or if desired, such gas in conjunction with heat, is to make it possible to remove the complete pipe or tube formed within a mold such as the mold 14 within a relatively brief or short period without their being danger of deformation of such article. This, of course, means that it is possible to reduce the capital investment in molds employed. The particular expedients herein explained also permit the complete machine 10 to be operated at a comparatively high speed in laying up or creating a complete pipe or other article.

It will be recognized that the benefits of this invention can be achieved by omitting the use of one or more of the various different means for applying and/or mixing and/or exposing carbon dioxide gas described in the preceding. Whenever one or more of these means are omitted there is a corresponding reduction in the beneficial results achieved with invention unless, of course, the particular design parameters of a particular machine used effectively are such as to make the utilization of more than one of the various means for applying this carbon dioxide gas unnecessary. Because of this one or more or any combination of less than all of the means for supplying and using carbon dioxide gas can be employed with the invention.

Thus, for example, it is possible to omit within the machine 10 the passage 62, the inlet pipe 60, the inlet pipe 58 and the hollow shaft 16 and other structures used in connection with this inlet pipe 58, the manifold 50 or even the inlet 48 leading into the mixing structure 42. At least one of these means must, however, be utilized in order to achieve the beneficial results of this invention. Obviously various equivalent structures to those shown can be employed. Thus, for example, instead of the manifold 50 the inlet 54 may lead directly into the chute 44, although this is not considered as desirable as the manifold 50, because the manifold structure described provides a means for supplying carbon dioxide gas to a greater quantity of surface the material moving through the chute 44.

Figure 3:
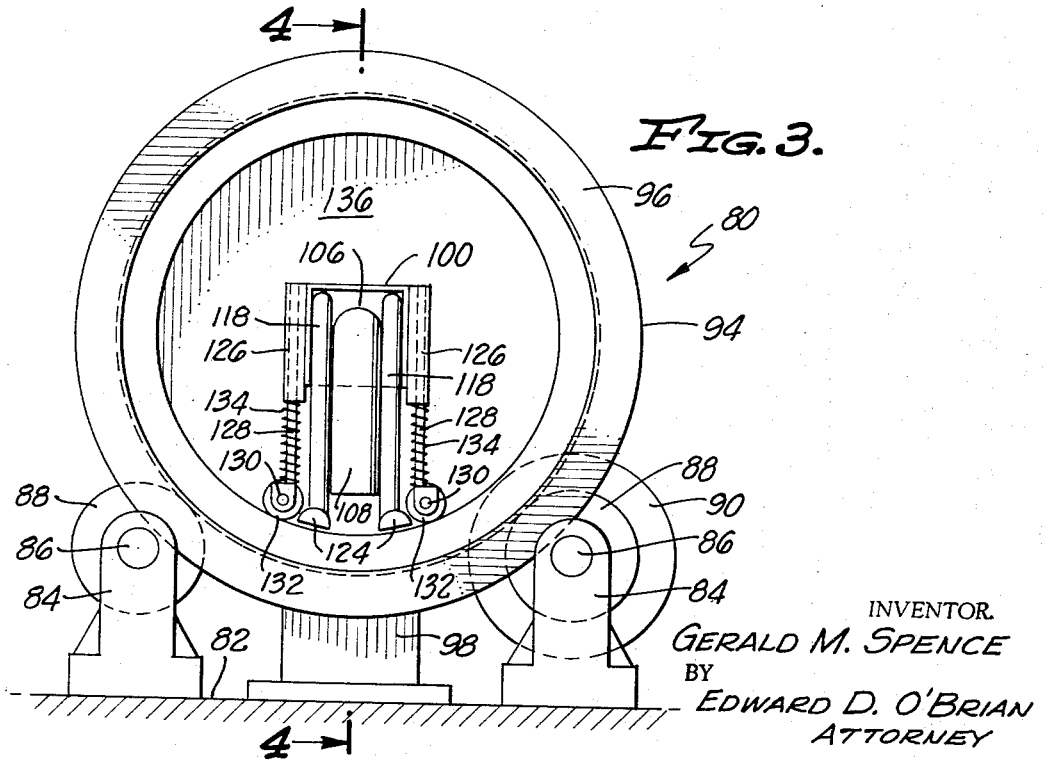
FIG. 3 is an end elevational view of a "centrifugal" type of pipe casting embodying this invention.

In FIGURES 3 and 4 of the drawing there is shown a pipe casting machine 80 of the so-called "centrifugal casting" variety. This machine is supported upon a conventional supporting surface 82, by means of bearings 84. These bearings 84 hold rotatable shafts 86; these shafts 86 in turn support rollers 88. At least one of the shafts 86 is attached to a conventional motor 90 through a conventional coupling 92. The rollers 88 support a generally cylindrical mold 94 having a bell-shaped end 96. The interior of this mold 94 is designed so as to conform closely to the dimensions of a pipe to be created during the use of machine 80. This mold is adapted to be driven during the operation of the motor 90 so as to be rotated at an appropriate speed, such as the speed of 200–300 r.p.m.

Adjacent to the mold 94 a sliding bearing structure 98 is mounted upon a surface 82. This bearing structure 98 is adapted to hold a beam 100 so that this beam may be moved into and throughout the entire length of the interior of the mold 94 by the actuation of a conventional hydraulic cylinder attached to the bearing 98 and the beam 100. Other equivalent means may be employed in place of the cylinder 102 for the purpose of causing relative movement along an axial direction between the mold 94 and the end 104 of the beam 100.

The beam carries a distributing pipe 106 which extends throughout its length and terminates in an end 108 located at right angles to the beam 100 so as to extend to adjacent to the interior of the lowermost portion of the mold 94. The other end 110 of the beam 100 is connected by a flexible hose 112 to a conventional mixer-conveyor structure 114 of a type capable of mixing a concrete mixture and forcing such a mixture through the hose 112. Such a mixer-conveyor structure 114 may be of the so-called "gunite" variety; preferably it utilizes a broken flight screw conveyor mechanism for mixing and conveying purposes in order to mix within the concrete mixer carbon dioxide gas introduced into its interior through a pipe 116.

Within the beam 100 there is located a carbon dioxide gas supply pipe 117 which terminates in a restricted nozzle 119 located within the interior of the end 108 of the distributing pipe 106. The beam 100 also carries other pipes 118 which are connected by flexible hoses 120 to a source of carbon dioxide gas. These pipes 118 terminate in ends 122 which are located at each side of the end 108 of the pipe 106. Each of the ends 122 may carry a gas distributing hood 124 located so as to face the interior of the mold 94.

The beam 100 also carries two pairs of brackets 126 which extend along the ends 108 and 122 of the pipe 106 and 118 as shown in the drawing. These brackets 126 serve as sliding bearings in order to carry shafts 128 which in turn carry between each pair of the brackets 128 support shafts 130. These support shafts 130 carry rollers 132 having curved ends which are adapted to rotate upon them. Coil springs 134 are preferably located around the shafts 128 so as to be held under compression between these shafts and the brackets 126 in order to bias the rollers 132 in the direction of the mold 96.

Preferably the beam 100 carries adjacent to the end 104 a disc-like shield 136 which is spaced a comparatively short distance from the interior of the mold 96 when the end 104 is located within the interior of the mold 94. The machine 80 also includes a hood 138 fitting closely against, but spaced from the end 96 of the mold 94. This hood 138 carries a carbon dioxide gas inlet pipe 140.

The use of the machine 80 is essentially very similar to the use of the machine 10, although it differs from the use of the earlier machine 10 in several important respects. As it is used the motor 90 is operated so as to rotate the mold 94. Initially the beam 100 is located so that its end 104 is positioned in such a position that the end 108 of the distributing pipe 106 is located immediately adjacent to and over the end 96 of the mold. When in this position the mixer-conveyor 114 is actuated so as to supply material 142 to the interior of the mold. As the mold is rotated such material is "smoothed" and pressed by the rollers 132 so as to assume a configuration as indicated in the drawing. As this is carried out the beam 100 is gradually withdrawn from the end 96 so that a uniform, smooth deposit of the material 142 is created. This operation is continued until such time as a complete pipe is created from the material 142 in this manner by the beam 100 being completely withdrawn from the interior of the mold 94.

During these operations carbon dioxide gas is continuously supplied to the material moving through the pipe 102 by being introduced into the mixer-conveyor 114. Simultaneously, carbon dioxide gas is continuously supplied through the pipes 118 to the surface where material is to be deposited within the mold 94 and to the material just deposited because of the locations of the hoods 124. Hence, the material deposited is contacted by gas from these sources substantially as it is deposited. In addition carbon dioxide gas is supplied through the nozzle 119 in such a manner so as to not only contact the material moving through the end 108 but so as to tend to force this material into position against the mold 94. Also as these operations are carried out the entire interior of the mold 94 between the shield 136 and the hood 138 is effectively "bathed" in carbon dioxide gas introduced to the pipe 140 so as to be filled with this gas.

The results flowing from the use of carbon dioxide gas in this manner are substantially the same as those achieved in connection with the use of the machine 10. As a consequence of this various matters discussed in conjunction with machine 10 are not repeated. The net result of use of quantities of carbon dioxide gas as indicated so that this gas contacts a concrete mixture a comparatively short time interval before it is applied in the mixer conveyor, as it is applied through the operation of one of the hoods 124 and immediately after it is applied through the operation of the other of the hoods 124 and it is held within the mold 94 during the operation of the machine 80 is that the material deposited and caused to assume a desired shape is comparatively stiff and viscous, and will not sag or otherwise deform in the same manner as deposits of conventional concrete after removal from the mold 94. This in turn results in it being possible to remove a molded article from the mold used without significant danger of deformation.

It will be recognized and realized that the benefits of the present invention can to degrees be achieved by omitting the use of one or more of the various different means for applying and/or mixing and/or exposing carbon dioxide gas to a concrete mixture described in the preceding. As with the machine 10 there is a corresponding reduction with beneficial results achieved with the invention by omitting one or more of these means unless of course the design parameters of a particular machine make utilization of any of these particular means of applying carbon dioxide gas unnecessary.

Thus, for example, it is possible to utilize so as to achieve various degrees of effectiveness of the complete machine 80 a modified machine omitting the pipe 117, the pipe 118 or the pipe 140 or the pipe 116 so long as at least one of these various different means is employed.

I claim:

In an apparatus for molding a hollow concrete article, said apparatus comprising:
a hollow mold having an axis and having an interior surface;
distributing head means located within said mold, said mold means being rotatable with respect to said distributing head upon said axis;
means for causing relative movement between said mold and said distributing means along the length of said axis;
means for supplying a concrete mixture to the interior of said mold, wherein the improvement comprises:
at least one roller located on said distributor head means, said roller being mounted on said distributor head means so as to have an axis substantially parallel to said mold axis, said roller being positioned with respect to said interior surface of said mold so that said roller is positioned to form the concrete mixture against the interior surface of said mold, said roller being movably mounted with respect to said distributor head means so as to be movable towards and away from the interior surface of said mold;
at least one shield positioned with respect to said mold so as to substantially retain carbon dioxide gas within said mold;
means for substantially filling the interior of said mold with carbon dioxide gas, said means including a gas distributor hood positioned against said roller and directed to face the interior surface of said mold.

References Cited

UNITED STATES PATENTS

| 1,768,451 | 6/1930 | Hume | 25—30 |
| 1,932,150 | 10/1933 | Tada | 264—82 |
| 3,206,821 | 9/1965 | Keyser et al. | 25—30 |
| 3,263,285 | 8/1966 | Rojecki | 25—30 |

FOREIGN PATENTS

| 151,954 | 5/1962 | U.S.S.R. |
| 560,138 | 3/1944 | Great Britain. |

J. SPENCER OVERHOLSER, *Primary Examiner.*

R. D. BALDWIN, *Assistant Examiner.*